US008099579B2

(12) United States Patent
Burns et al.

(10) Patent No.: US 8,099,579 B2
(45) Date of Patent: Jan. 17, 2012

(54) SYSTEM AND METHOD FOR CACHE-LOCKING MECHANISM USING SEGMENT TABLE ATTRIBUTES FOR REPLACEMENT CLASS ID DETERMINATION

(75) Inventors: Adam Patrick Burns, Palo Alto, CA (US); Jason Nathaniel Dale, Austin, TX (US); Jonathan James DeMent, Austin, TX (US); Gavin Balfour Meil, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 705 days.

(21) Appl. No.: 11/777,319

(22) Filed: Jul. 13, 2007

(65) Prior Publication Data
US 2009/0019255 A1 Jan. 15, 2009

(51) Int. Cl.
*G06F 12/00* (2006.01)
(52) U.S. Cl. .......................... 711/206; 711/122; 711/209
(58) Field of Classification Search .................. 711/1, 3, 711/209, 202, 206, 122, 6, 207
See application file for complete search history.

(56) References Cited

U.S. PATENT DOCUMENTS

| 5,307,477 | A  | * | 4/1994  | Taylor et al. ...................... 711/3 |
| 5,835,928 | A  | * | 11/1998 | Auslander et al. ................. 711/3 |
| 6,574,698 | B1 | * | 6/2003  | Dhong et al. ..................... 711/3 |
| 2003/0009648 | A1 | * | 1/2003  | Doing et al. ................... 711/202 |
| 2003/0033483 | A1 | * | 2/2003  | O'Connor ..................... 711/122 |
| 2004/0117592 | A1 | * | 6/2004  | Day et al. ...................... 711/207 |
| 2005/0071571 | A1 | * | 3/2005  | Luick ............................ 711/137 |
| 2009/0019252 | A1 | * | 1/2009  | Burns et al. ................... 711/200 |

* cited by examiner

Primary Examiner — Matthew Bradley
(74) Attorney, Agent, or Firm — VanLeeuwen & VanLeeuwen; Matthew B. Talpis (57) ABSTRACT

A system, method, and program product are provided that identifies a cache set using Segment LookAside Buffer attributes. When an effective address is requested, an attempt is made to load the received effective address from an L2 cache. When this attempt results in a cache miss, the system identifies a segment within the Segment LookAside Buffer that includes the effective address. A class identifier is retrieved from the identified segment within the Segment LookAside Buffer. This class identifier identifies a cache set selected from the cache for replacement. Data is then reloaded into the cache set of the cache by using the retrieved class identifier that corresponds to the effective address.

20 Claims, 7 Drawing Sheets

SYSTEM AND METHOD FOR CACHE-LOCKING MECHANISM USING SEGMENT TABLE ATTRIBUTES FOR REPLACEMENT CLASS ID DETERMINATION

BACKGROUND OF THE INVENTION

1. Technical Field

The present invention relates to a system and method that uses segment table attributes for replacement class identifier determination in a locking cache. More particularly, the present invention relates to a system and method that selects a "way" (or "set") of aof an n-way set-associative cache based on data stored in a Memory Management Unit's Segment LookAside Buffer (SLB).

2. Description of the Related Art

A cache often has a number of "ways" or "sets." In one implementation, a cache with four "sets" is implemented using a cache with four columns for storing data, with each of the columns ("sets") corresponding to a particular class identifier. Application developers often use the sets in order to store similar information. For example, in a four set cache, one set can be designated to store "streaming" data, two sets can designated to store "locking" data, and the fourth set can be designated to store general data. In this example, all streaming data (e.g., video, multimedia, etc.) is sent to the streaming set of the cache in order to prevent "polluting" the cache. Likewise, the locking sets of the cache are ideally used to store data in order to ensure real-time functionality. One challenge of the prior art is that the cache set that is used is often pre-determined during compilation. If the condtions at application run-time are different than the assumptions made at compile time, data may be sent to the wrong cache set which may, as described above, impact performance if the cache is polluted or data used for real-time functionality is not readily available.

Traditional Replacement Management Table (RMT) implementations use range registers that are based on effective address ranges and are associated with specific class identifiers that identify the cache set. The range registers are typically hardware-based registers. One challenge of the traditional approach is the hardware overhead used to dedicate range registers that are used for RMT management. Another challenge facing this traditional approach is that the number of active RMT classes is limited to the number of Effective Address Range (EAR) registers that have been architected into the hardware design.

Another challenge facing the traditional approach is the difficulty in changing the RMT configuration of a system. Using the traditional approach, multiple software load and store operations are needed in order to set up, or configure, the fields used in RMT management. These registers must also be managed by the operating system with little flexibility in specifying conditions per software application.

The traditional approach's use of pre-architected EAR registers limits a system's flexibility of the RMT and relies upon the course compile-time allocation of EAR registers described above. This inflexibility limits the Memory Management Unit's (MMU's) control over various memory units. In addition, the traditional implementation imposes compile-time constraints on cache-locking. Imposing such compile-time constraints on cache-locking restricts the Virtual Memory Manager (VMM) from providing fine-grain control over the cache and, thus, may result in poor performance.

SUMMARY

It has been discovered that the aforementioned challenges are resolved using a system, method and computer program product that identifies a cache set using Segment LookAside Buffer attributes. When an effective address is requested, an attempt is made to load the received effective address from an L2 cache. When this attempt results in a cache miss, the system identifies a segment within the Segment LookAside Buffer that includes the effective address. A class identifier is retrieved from the identified segment within the Segment LookAside Buffer. This class identifier identifies a cache set selected from the cache. Data is then reloaded into the specified cache set of the cache by using the retrieved class identifier that corresponds to the effective address.

In another embodiment, another attempt is made to identify the effective address in a second cache after the attempt to load the effective address from the L2 cache resulted in a cache miss. This second cache is a cache of recently used address translations. If the effective address is successfully identified in the second cache, a real address is retrieved along with the class identifier from the second cache. Then the real address and the class identifier that were retrieved from the second cache are used to reload the data from the L2 cache.

In one embodiment, identifying the segment within the Segment LookAside Buffer that includes the effective address results in a Segment LookAside Buffer miss. In response to the miss, a software interrupt is generated and the Segment LookAside Buffer is reloaded.

In another embodiment, the reloading of the data from the cache set of the L2 cache by using the retrieved class identifier that corresponds to the effective address entails loading a real address corresponding to the effective address and the retrieved class identifier to an L1 cache that includes recently used effective-to-real address translations. Then the real address and the class identifier are loaded in the L2 cache. Afterwards, the data is reloaded from the cache after the real address and the class identifier have been loaded in the cache. In a further embodiment, the reloading of the data results in a second cache miss. This is handled by retrieving the data from main memory, storing the retrieved data in the L2 cache, and re-performing the reloading of the data from the L2 cache.

In another embodiment, the L2 cache is checked for the received effective address, with the L2 cache includes at least two L2 caches, where one of the multiple L2 caches is an instruction cache, and one of the L2 caches is a data cache. In this embodiment, when the received effective address is found in one of the L2 caches, then an instruction included in the reloaded data is executed when the effective address corresponds to data found in the L2 instruction cache. If the effective address corresponds to data found in the L2 data cache, then the data is loaded in a register. In this embodiment, when the effective address is not found in one of the L2 caches, then an L1 cache is checked that includes recently used effective-to-real address translations. If the received effective address is found in the L1 cache, then the real address and the class identifier is loaded in one of the L2 caches depending on whether it is data or an instruction. The data is reloaded from the L2 cache after the real address and the class identifier have been loaded in the selected L2 cache. However, if the effective address is not found in the L1 cache, then the real address and the class identifier is loaded in the L1 cache from the Segment LookAside Buffer in response to determining that the received effective address is within a segment range stored in the Segment LookAside Buffer, and reloading the Segment LookAside Buffer in response to determining that the received effective address is not within a segment range stored in the Segment LookAside Buffer.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
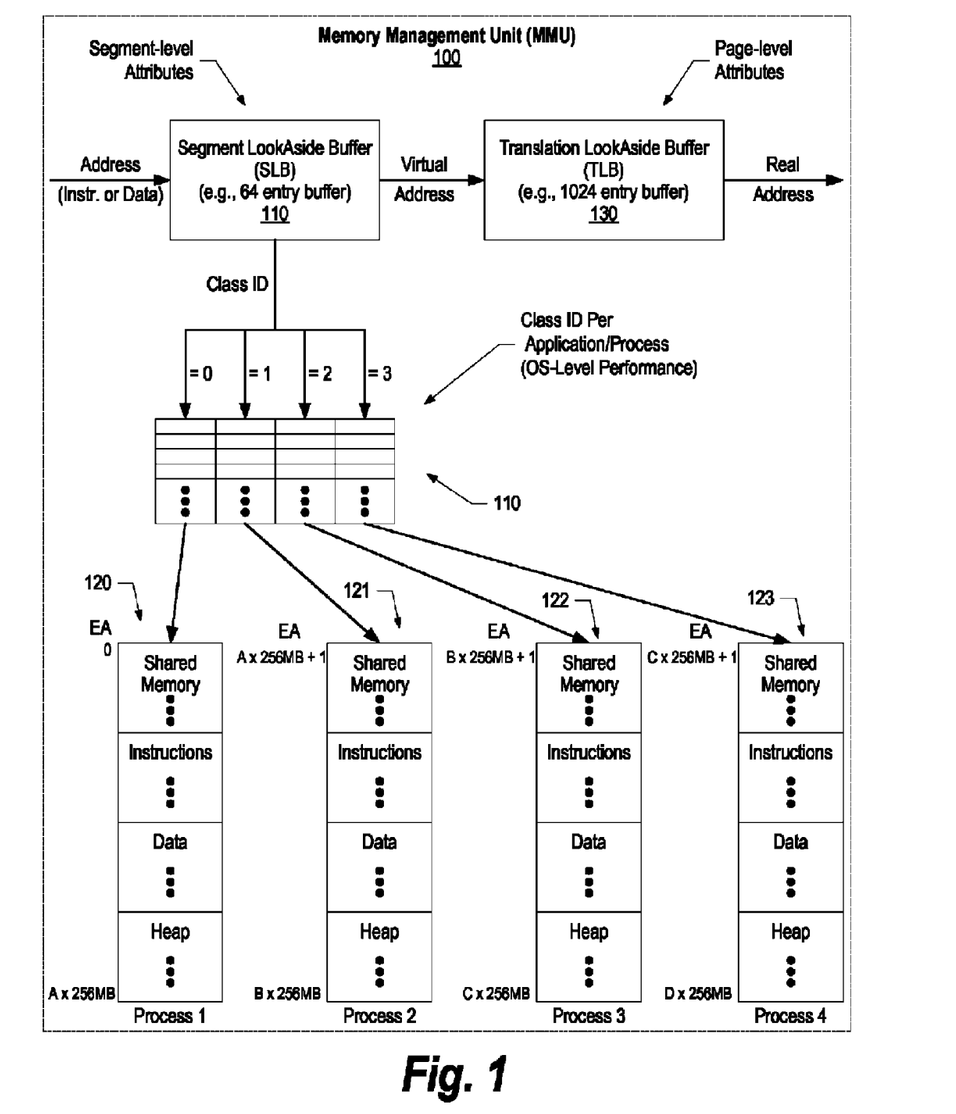
FIG. 1 is a diagram showing a memory management unit (MMU) with a Segment LookAside Buffer (SLB) that is used to determine the replacement cache set.
Figure 2:
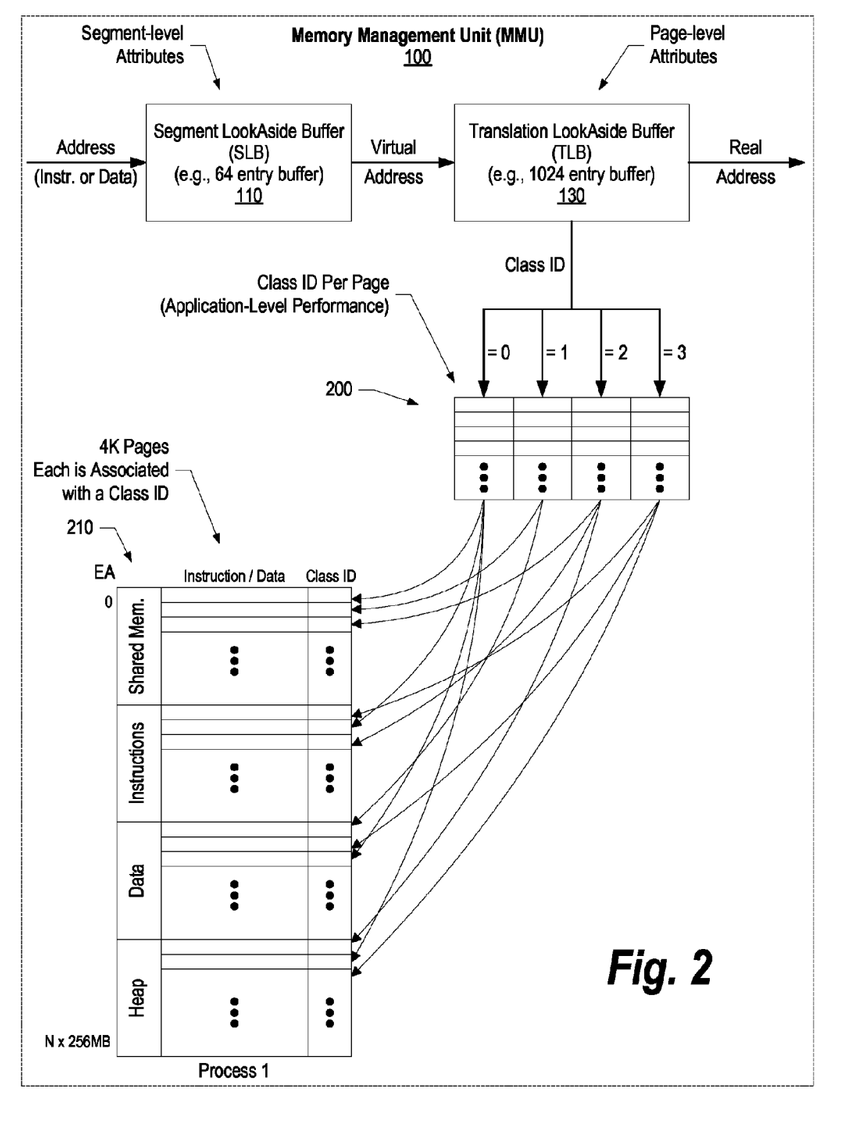
FIG. 2 is a diagram showing the MMU with a Translation LookAside Buffer (TLB) that is used to determine the replacement cache set.

FIG. 1 is a diagram showing a Memory Management Unit (MMU) with a Segment LookAside Buffer (SLB) that is used to determine the cache set. Memory Management Unit 100 includes Segment LookAside Buffer 110 and Translation LookAside Buffer 130. Two different embodiments are provided. One, introduced in FIG. 1, uses the Segment LookAside Buffer to provide class identifiers that identify a cache set (i.e., a "way", etc.) within a cache, which is typically an L2 cache. A second approach, introduced in FIG. 2, uses the Translation LookAside Buffer to provide the class identifiers. As shown in FIG. 1, using the Segment LookAside Buffer generally provides a class identifier at the application or process level of granularity and generally provides operating system level performance. On the other hand, as shown in FIG. 2, using the Translation LookAside Buffer to provide the class identifiers provides a class identifier on a per-page basis, which generally provides application-level performance with a somewhat greater level of granularity than that of the Segment LookAside Buffer approach. It will be appreciated by those skilled in the art that a hybrid approach can be used that retrieves class identifier information from both the Segment LookAside Buffer and the Translation LookAside Buffer in order to provide either operating system level performance or application level performance based on the needs and requirements of the particular process.

Turning to the details of FIG. 1 that uses the Segment LookAside Buffer to provide the class identifiers, an address (either an instruction address or a data address) are received at Segment LookAside Buffer 110. A typical Segment LookAside Buffer may be implemented in a 64 entry buffer. Bits within the Segment LookAside Buffer are used to store the class identifier. In the example shown, two bits are used, thus providing four possible class identifiers. It will be appreciated by those skilled in the art that fewer or more class identifiers can be implemented based on the needs of the system and the number of bits reserved in the Segment LookAside Buffer for storing the class identifiers.

In the example shown in FIG. 1 where four class identifiers are used, each of the class identifiers is shown corresponding to a cache set that is used to store information for four different processes (processes 1, 2, 3, and 4). In the implementation shown, the segment is 256 MB deep, so within the 256 MB range of each segment, the shared memory, instructions, data, and heap for each process are stored. When the class identifier is zero (0), cache set 120 is used. Likewise, when the class identifier is one, cache set 121 is used, when the class identifier is two, cache set 122 is used, and when the cache identifier is three, cache set 123 is used.

The result of the Segment LookAside Buffer lookup is a virtual address which is passed to Translation LookAside Buffer 130. In the example shown, the Translation LookAside Buffer is a larger (1024 entry) buffer. The result of looking up the virtual address in the Translation LookAside Buffer is a real address. The real address either corresponds to an instruction that is loaded/executed or to data that is loaded into a data register.

FIG. 2 is a diagram showing the MMU with a Translation LookAside Buffer (TLB) that is used to determine the cache set. Here, the effective address is processed by Segment LookAside Buffer 110 in order to provide a virtual address that is passed to Translation LookAside Buffer 130. In the implementation shown, the Translation LookAside Buffer is a 1024 entry buffer, in contrast to the 64 entry buffer of the Segment LookAside Buffer. Like the implementation shown in FIG. 1, the class identifier used in the example shown in FIG. 2 is a two bit field stored in the Translation LookAside Buffer. However, because there are far more entries in the Translation LookAside Buffer than in the Segment LookAside Buffer, having the class identifiers in the Translation LookAside Buffer generally provides a class identifier per processor virtual page.

In the example shown, the cache identifier points to one of four cache sets 200. The virtual memory map 210 has a number of 4K pages and each page is associated with a class identifier. The same process (Process 1) is shown with its shared memory, instructions, data, and heap stored in the virtual memory. The result of the Translation LookAside Buffer lookup is a real address that is used to either load/execute an instruction from the L2 cache or load data from the L2 cache into a register. The cache identifier dictates which set in the L2 and TLB the instructions and data are loaded into.

In comparison to the Segment LookAside Buffer implementation shown in FIG. 1, when the Segment LookAside Buffer is used to provide the class identifier, the allocation of sets is done on a segment-level basis. Typically an application will have only a small number of segments allocated. In contrast, when the Translation LookAside Buffer is used to provide the class identifier, the allocation of sets is done on a virtual page basis. Typically an application will have a large number of virtual pages allocated. Similarly, when the Segment LookAside Buffer is used to provide the class identifiers, operating system-level performance is achieved, while using the Translation LookAside Buffer approach generally yields application-level performance. In a hybrid approach, a bit could be implemented in the Segment LookAside Buffer and the Translation LookAside Buffer indicting whether the class identifier for a particular effective address is retrieved using either data stored in the Segment LookAside Buffer or in the Translation LookAside Buffer. While adding complexity to the design, the hybrid approach allows both operating system level performance or greater granularity and application-level performance based on the needs and requirements of the particular process. Depending on the processor implementation, either embodiment or a combination of both may be preferred.

Figure 3:
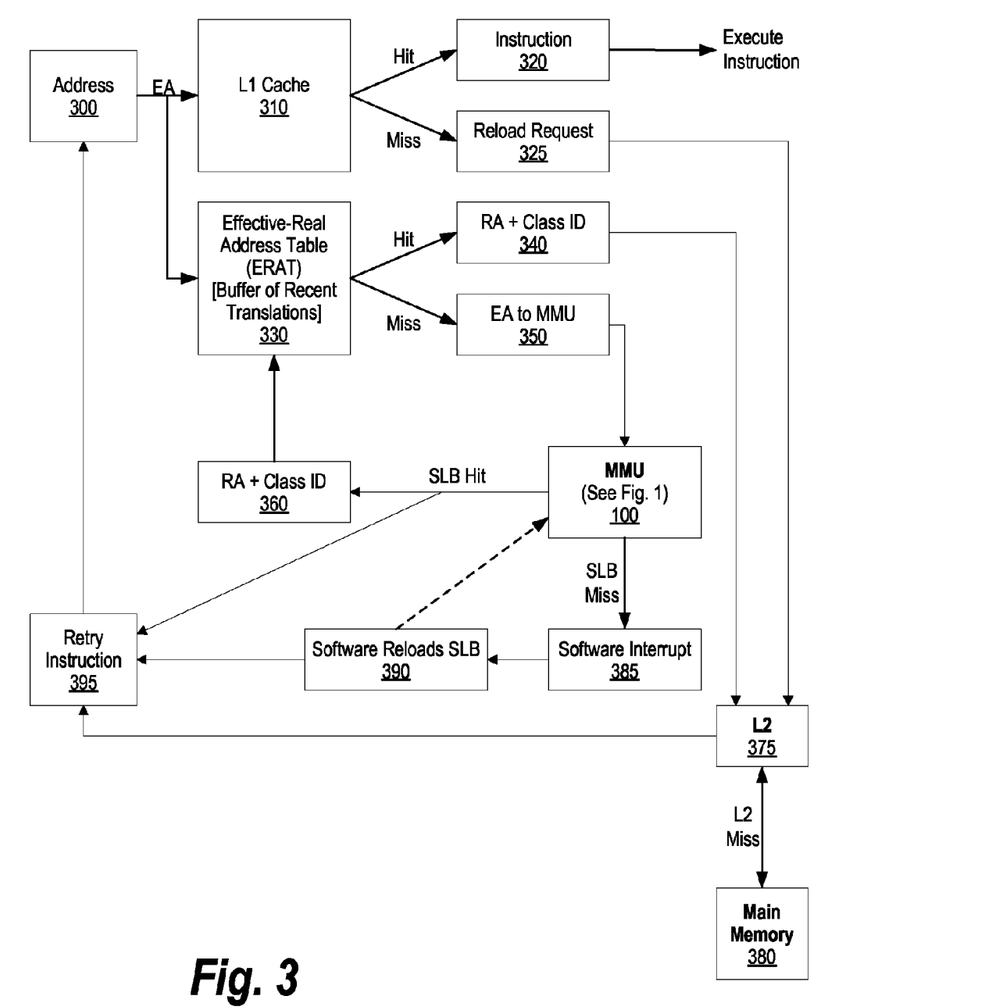
FIG. 3 is a component diagram showing the various components involved in using SLB attributes to determine the class identifier of the cache set.

FIG. 3 is a component diagram showing the various components involved in using SLB attributes to determine the class identifier of the cache set. Effective address 300 is received. The effective address is looked up in L1 cache 310. If the effective address is found in the cache, instruction (or data) 320 is retrieved from the cache and executed (if an instruction) or loaded in a register (if data). On the other hand, if the effective address is not found in the cache (a cache miss), then reload request 325 is processed to reload data in cache using L2 cache 375. When an L2 cache miss occurs, the needed data is retrieved from main memory 380. Processing then retries the instruction (395). Because L1 cache 310 is reloaded, it is more likely that, when retried, the effective address will be found in L1 cache 310. However, if the data needs to be reloaded from main memory 380, additional time may be needed before the effective address is found in L1 cache 310.

In parallel, the effective address is provided to ERAT 330. ERAT is an Effective-Real Address Table (e.g., an L1 cache) of recent effective-to-real address translations. If the effective address is found in ERAT 330, then the hit results in a real address (RA) and a class identifier being retrieved from the ERAT. The real address and class identifier (340) are used to look up the instruction (or data) from L2 cache 375. If the L2 cache lookup results in a miss, data is retrieved from main memory 380 and loaded into the L2 cache. Because L1 cache 310 is reloaded, it is more likely that, when retried, the effective address will be found in L1 cache 310. However, if the data needs to be reloaded from main memory 380, additional time may be needed before the effective address is found in L1 cache 310. On the other hand, if the ERAT lookup results in a miss, then the effective address (350) is looked up in memory management unit 100 using the Segment LookAside Buffer as shown in FIG. 1. If the effective address is found in the Segment LookAside Buffer, then the real address and class identifier (360) are reloaded into ERAT 330 and the address is retried. On the other hand, if the effective address is not found in the Segment LookAside Buffer, then a miss occurs whereupon a software interrupt is generated (385), software is used to reload the Segment LookAside Buffer (390), and the instruction is retried (395). When the instruction is retried, the real address and class identifier will be in ERAT 330 and will be used to retrieve data from L2 cache 375 using the appropriate cache set.

Figure 4:
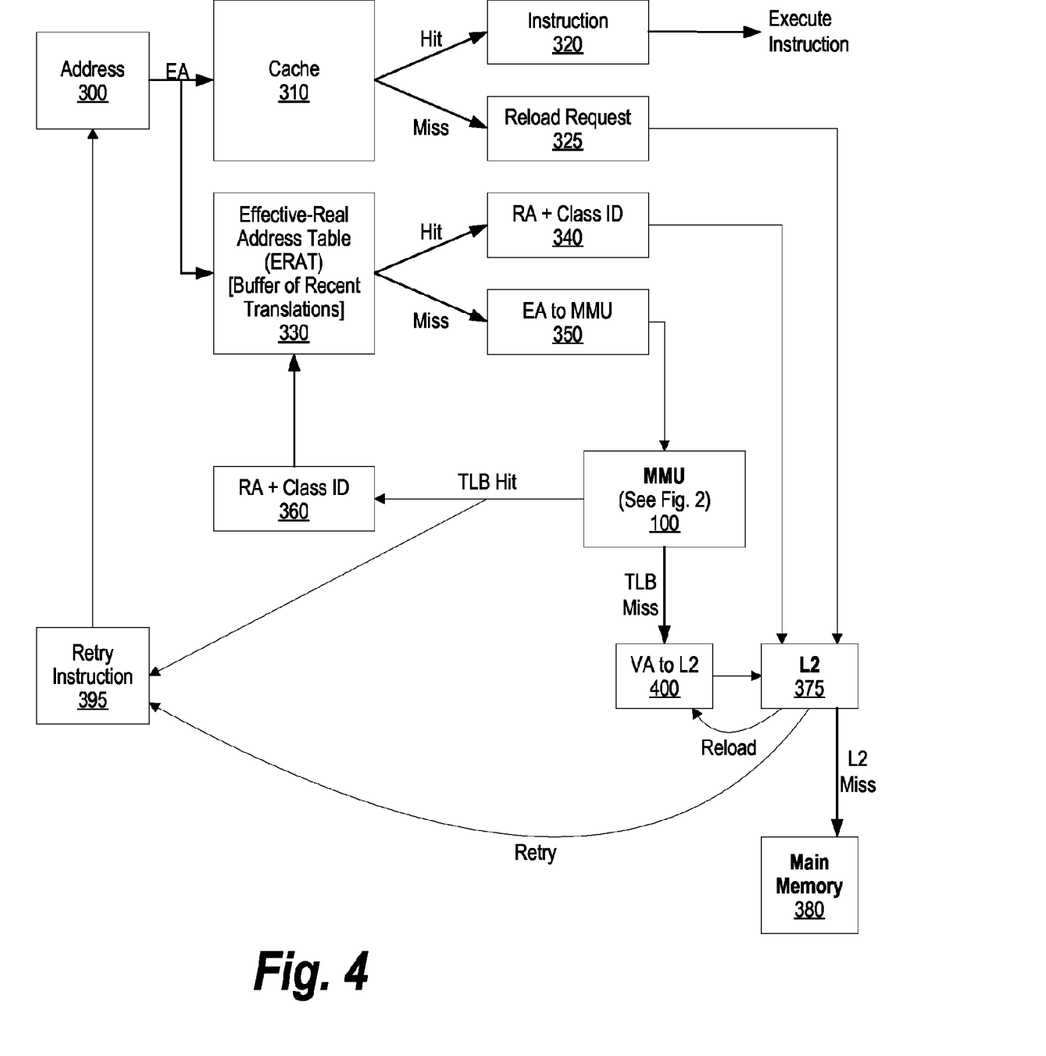
FIG. 4 is a component diagram showing the various components involved in using TLB attributes to determine the class identifier of the cache set.

FIG. 4 is a component diagram showing the various components involved in using TLB attributes to determine the class identifier of the cache set. Many of the components shown in FIG. 4 are the same or similar to those shown and described in FIG. 3. However, in FIG. 3, the Translation LookAside Buffer is being used, so some steps are different, especially when retrieving data from the memory management unit.

Components and steps 300 to 395 are essentially the same in FIG. 4 as the same numbered components and steps shown in FIG. 3. However, when a lookup of ERAT 330 results in a miss and effective address is sent to Memory Management Unit 100, the MMU as described in FIG. 2 is used rather than the MMU described in FIG. 1. In other words, the MMU uses the Translation LookAside Buffer to lookup the class identifier rather than using the Segment LookAside Buffer.

When the Translation LookAside Buffer in MMU 100 successfully looks up a virtual address corresponding to the effective address (translated by MMU 100), a TLB hit occurs, with the real address and class identifier being reloaded in ERAT 330 and the address is retried at 395. On the other hand, if the virtual address is not found in the MMU and results in a Translation LookAside Buffer miss, then Virtual Address to L2 Cache 400 is performed to reload the data from L2 cache 375. If the data is not found in L2 Cache 375, an L2 cache miss occurs and the data is reloaded from memory 380. The address is then retried (395). This process repeats until the instruction or data is found in L1 cache 310 resulting in a hit and the instruction is executed (320) or the data is loaded in a register.

Figure 5:
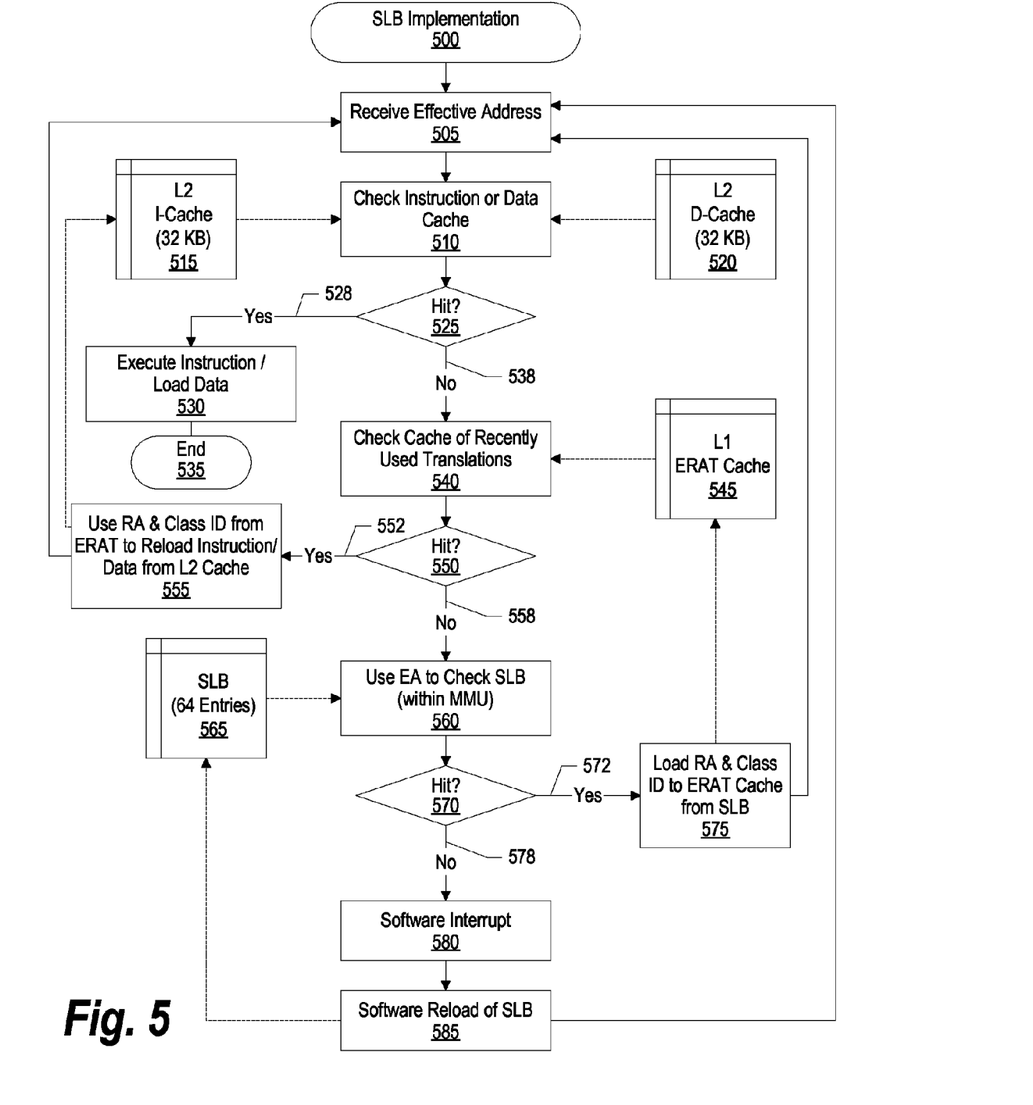
FIG. 5 is a flowchart showing the steps taken to load an instruction or data from a cache when using the SLB to provide the class identifier of the cache set.

FIG. 5 is a flowchart showing the steps taken to load an instruction or data from a cache when using the SLB to provide the class identifier of the cache set. SLB processing commences at 500 whereupon, at step 505, an effective address is received for processing. At step 510, either instruction cache 515 or data cache 520 are checked for the received effective address. In the example shown, each of the caches (the L2 instruction cache and the L2 data cache) are 32 KB. A determination is made as to whether a hit was made in either the instruction or data cache (decision 525). If a hit occurred, then decision 525 branches to "yes" branch 528 whereupon, at step 530, the instruction is executed or the data is loaded (depending on whether the data was in the instruction or data cache), and processing ends at 535.

If a miss occurs, then decision 525 branches to "no" branch 538 whereupon, at step 540, L1 ERAT cache 545 is checked for the effective address. The ERAT is a cache of recently used effective-to-real address translations. A determination is made as to whether the effective address was found in the L1 ERAT cache (decision 550). If the effective address was found in the L1 ERAT cache, then decision 550 branches to "yes" branch 552 whereupon, at step 555, the real address and class identifier retrieved from the ERAT cache are used to reload either instruction L2 cache 515 or data L2 cache 520, and processing loops back to step 505 in order to retry processing the effective address.

On the other hand, if the effective address was not found in L1 ERAT Cache 545, then decision 550 branches to "no" branch 558 whereupon, at step 560, the effective address is used to check Segment LookAside Buffer 565 to determine if the effective address is within a range of addresses maintained by the Segment LookAside Buffer. In the example shown, Segment LookAside Buffer 565 has 64 entries with each entry covering a range of addresses that do not overlap. A determination is made as to whether the effective address was found in a range of addresses of one of the entries in the Segment LookAside Buffer (decision 570). If the effective address is within a range of addresses of one of the entries of the Segment LookAside Buffer, then decision 570 branches to "yes" branch 572 whereupon, at step 575, the real address and class identifiers are reloaded in the L1 ERAT cache using data from the Segment LookAside Buffer and processing loops back to step 505 to retry processing of the effective address.

Because the entries of the Segment LookAside Buffer each cover a range of addresses, the effective address will most often be within an address range corresponding to one of the Segment LookAside Buffer entries. However, if the effective address is not within a range of addresses from the any of the entries in the Segment LookAside Buffer, then decision 570 branches to "no" branch 578 whereupon, at step 580, a software interrupt is generated that, at step 585, results in a software reload of the Segment LookAside Buffer and processing loops back to step 505 to retry processing of the effective address. The various loops shown in FIG. 5 and described above are repeated as necessary until the instruction (or data) is found in the instruction (or data) cache and the instruction is executed or the data is loaded at which point processing ends at 535.

Figure 6:
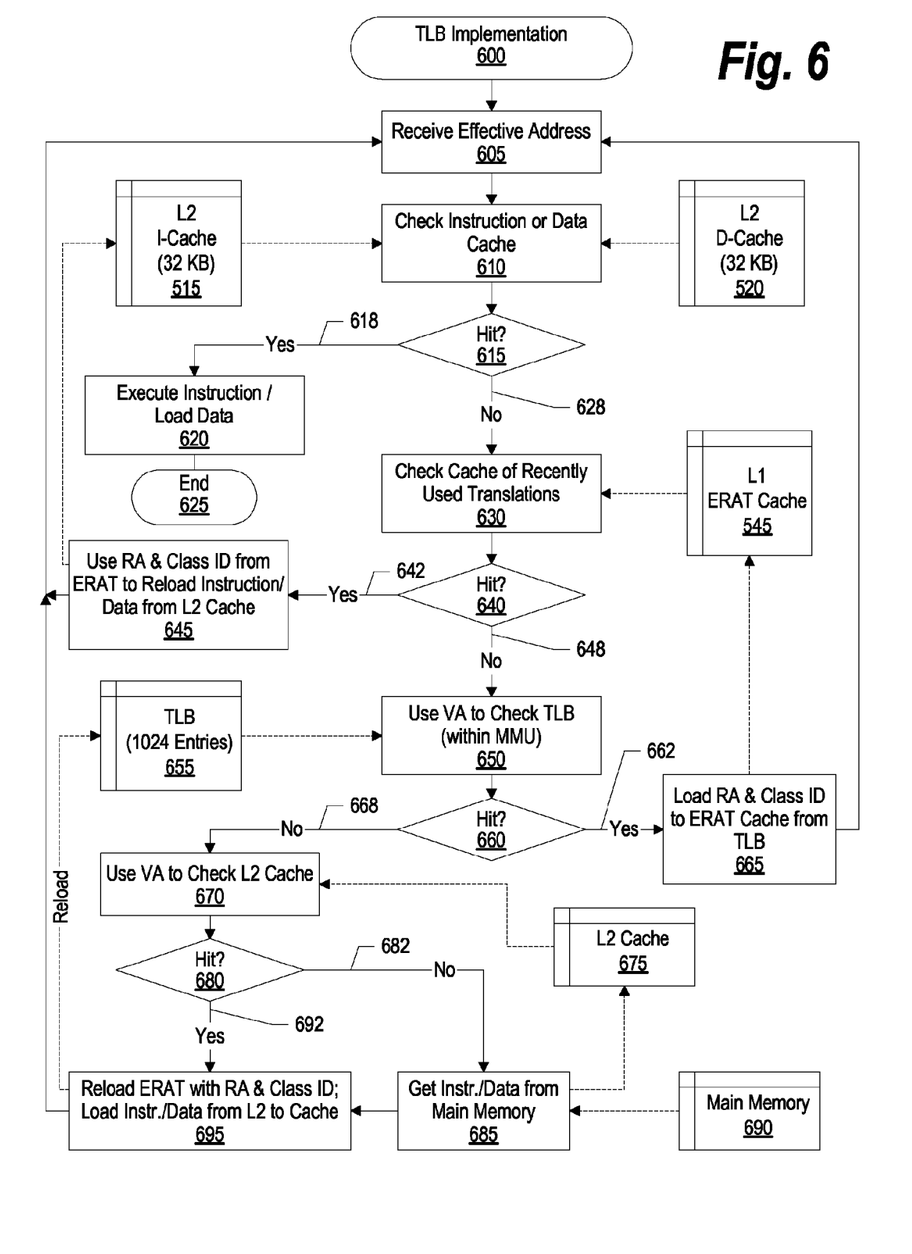
FIG. 6 is a flowchart showing the steps taken to load an instruction or data from a cache when using the TLB to provide the class identifier of the cache set.

FIG. 6 is a flowchart showing the steps taken load an instruction or data from a cache when using the TLB to provide the class identifier of the cache set. Processing commences at 600 whereupon, at step 605, an effective address is received for processing. At step 610, either instruction cache 515 or data cache 520 are checked for the received effective address. In the example shown, each of the caches (the L2 instruction cache and the L2 data cache) are each 32 KB caches. A determination is made as to whether a hit was made in either the instruction or data cache (decision 615). If a hit occurred, then decision 615 branches to "yes" branch 618 whereupon, at step 620, the instruction is executed or the data is loaded (depending on whether the data was in the instruction or data cache), and processing ends at 625.

If a miss occurs, then decision 615 branches to "no" branch 628 whereupon, at step 630, L1 ERAT cache 545 is checked for the effective address. A determination is made as to whether the effective address was found in the L1 ERAT cache (decision 640). If the effective address was found in the L1 ERAT cache, then decision 640 branches to "yes" branch 642 whereupon, at step 645, the real address and class identifier retrieved from the ERAT cache are used to reload either instruction L2 cache 515 or data L2 cache 520, and processing loops back to step 605 in order to retry processing the effective address.

On the other hand, if the check of the L1 ERAT cache does not result in a hit, then decision 640 branches to "no" branch 648 whereupon, at step 650 a virtual address corresponding to the effective address is used to check Translation LookAside Buffer 655 within the Memory Management Unit. A determination is made as to whether the virtual address was found in the Translation LookAside Buffer (decision 660). In one embodiment, the Translation LookAside Buffer corresponds to multiple pages, for example, 1024 4KB pages. In this manner, decision 660 checks if the virtual address is within the address range of one of the pages. If the virtual address is an address within the address range of one of the pages, then decision 660 branches to "yes" branch 662 whereupon, at step 665, the real address and the class identifier retrieved from the Translation LookAside Buffer are loaded to L1 ERAT cache 545 and processing loops back to step 605 in order to retry processing the effective address.

On the other hand, if the virtual address is not within an address range of one of the pages with an entry in the Translation LookAside Buffer, then decision 660 branches to "no" branch 668 whereupon, at step 670, the virtual address is used to check L2 Cache 675. A determination is made as to whether the virtual address was in the L2 cache (decision 680). If the virtual address is not in L2 Cache 675, then decision branches to "no" branch 682 whereupon, at step 685, the instruction (or data) is loaded from main memory 690 reloading L2 cache 675. On the other hand, if the virtual address is in L2 cache 675, then decision 680 branches to "yes" branch 692 bypassing step 685. At step 695, L1 ERAT cache 545 and TLB 655 are reloaded with the real address and class identifier (either retrieved from L2 cache 675 or main memory 690). In addition, instruction cache 515 or data cache 520 is loaded with either the instruction or data retrieved from either L2 cache 675 or main memory 690. Processing then loops back to step 605 in order to retry processing the effective address. The various loops shown in FIG. 6 and described above are repeated as necessary until the instruction (or data) is found in the instruction (or data) cache and the instruction is executed or the data is loaded at which point processing ends at 625.

Figure 7:
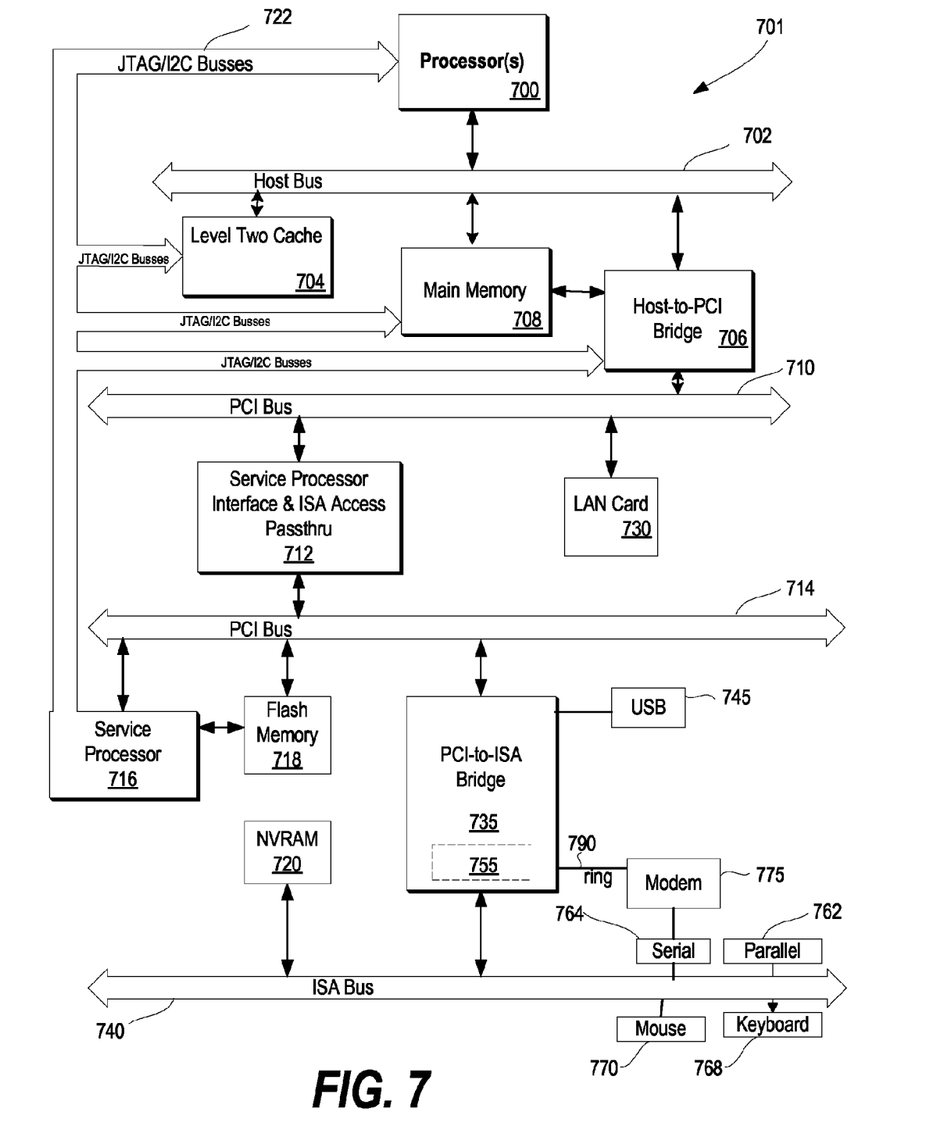
FIG. 7 is a block diagram of a data processing system in which the methods described herein can be implemented.

FIG. 7 illustrates information handling system 701 which is a simplified example of a computer system capable of performing the computing operations described herein. Computer system 701 includes processor 700 which is coupled to host bus 702. A level two (L2) cache memory 704 is also coupled to host bus 702. Host-to-PCI bridge 706 is coupled to main memory 708, includes cache memory and main memory control functions, and provides bus control to handle transfers among PCI bus 710, processor 700, L2 cache 704, main memory 708, and host bus 702. Main memory 708 is coupled to Host-to-PCI bridge 706 as well as host bus 702. Devices used solely by host processor(s) 700, such as LAN card 730, are coupled to PCI bus 710. Service Processor Interface and ISA Access Pass-through 712 provides an interface between PCI bus 710 and PCI bus 714. In this manner, PCI bus 714 is insulated from PCI bus 710. Devices, such as flash memory 718, are coupled to PCI bus 714. In one implementation, flash memory 718 includes BIOS code that incorporates the necessary processor executable code for a variety of low-level system functions and system boot functions.

PCI bus 714 provides an interface for a variety of devices that are shared by host processor(s) 700 and Service Processor 716 including, for example, flash memory 718. PCI-to-ISA bridge 735 provides bus control to handle transfers between PCI bus 714 and ISA bus 740, universal serial bus (USB) functionality 745, power management functionality 755, and can include other functional elements not shown, such as a real-time clock (RTC), DMA control, interrupt support, and system management bus support. Nonvolatile RAM 720 is attached to ISA Bus 740. Service Processor 716 includes JTAG and I2C busses 722 for communication with processor(s) 700 during initialization steps. JTAG/I2C busses 722 are also coupled to L2 cache 704, Host-to-PCI bridge 706, and main memory 708 providing a communications path between the processor, the Service Processor, the L2 cache, the Host-to-PCI bridge, and the main memory. Service Processor 716 also has access to system power resources for powering down information handling device 701.

Peripheral devices and input/output (I/O) devices can be attached to various interfaces (e.g., parallel interface 762, serial interface 764, keyboard interface 768, and mouse interface 770 coupled to ISA bus 740. Alternatively, many I/O devices can be accommodated by a super I/O controller (not shown) attached to ISA bus 740.

In order to attach computer system 701 to another computer system to copy files over a network, LAN card 730 is coupled to PCI bus 710. Similarly, to connect computer system 701 to an ISP to connect to the Internet using a telephone line connection, modem 775 is connected to serial port 764 and PCI-to-ISA Bridge 735.

While FIG. 7 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

One of the preferred implementations of the invention is a software application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   receiving a request to load data, the request including an effective address
   attempting to locate the data in a cache using the received effective address, the attempt resulting in a cache miss; and
   in response to the cache miss:
      identifying a segment lookaside buffer entry in a segment lookaside buffer, wherein the effective address is within a range of effective addresses included in the identified segment lookaside buffer entry;
      retrieving a class identifier comprising one or more bits from the identified segment lookaside buffer entry, wherein the class identifier identifies a cache set corresponding to a portion of the cache and corresponding to one of a plurality of processes; and
      loading the data into a data register from the cache set identified by the class identifier.

2. The method of claim 1 wherein the cache is an L2 cache and the method further comprises:
   attempting to identify the effective address in a second cache after the attempt to load the effective address from the L2 cache resulted in a cache miss, wherein the second cache is a cache of recently used translations;
   in response to successfully identifying the effective address in the second cache:
      retrieving a real address and the class identifier from the second cache; and
      using the real address and the class identifier retrieved from the second cache to reload the data from the L2 cache.

3. The method of claim 1 further comprising:
   prior to identifying the segment lookaside buffer entry that includes the effective address:
   failing to identify the segment lookaside buffer entry, the failure resulting in a subsequent cache miss; and
   in response to the subsequent cache miss:
      generating a software interrupt; and
      reloading the Segment LookAside Buffer.

4. The method of claim 1 wherein the loading further comprises:
   loading a real address corresponding to the effective address and the retrieved class identifier to an L1 cache that includes recently used effective-to-real address translations;
   loading the real address and the class identifier in the cache, wherein the cache is an L2 cache; and
   reloading the data from the cache after the real address and the class identifier have been loaded in the cache.

5. The method of claim 4 wherein the reloading of the data results in a subsequent cache miss, the method further comprising:
   retrieving the data from main memory;
   storing the retrieved data in the cache; and
   re-performing the reloading of the data from the cache.

6. The method of claim 1 further comprising:
   checking the cache for the received effective address, wherein the cache includes a plurality of L2 caches, wherein one of the plurality of L2 caches is an instruction cache, and wherein one of the plurality of L2 caches is a data cache;
   in response to the received effective address being found in one of the plurality of L2 caches:
      executing an instruction included in the loaded data in response to the effective address corresponding to data found in the L2 instruction cache; and
      loading the data in a register in response to the effective address corresponding to data found in the L2 data cache;
   in response to the received effective address not being found in one of the plurality of L2 caches:
      checking an L1 cache that includes recently used effective-to-real address translations;
      in response to the received effective address being found in the L1 cache:
         loading the real address and the class identifier in a selected one of the plurality of L2 caches; and
         reloading the data from the L2 cache after the real address and the class identifier have been loaded in the selected L2 cache;

in response to the received effective address not being found in the L1 cache:
  loading the real address and the class identifier in the L1 cache from the Segment LookAside Buffer in response to determining that the received effective address is within a segment range stored in the Segment LookAside Buffer; and
  reloading the Segment LookAside Buffer in response to determining that the received effective address is not within the segment range stored in the Segment LookAside Buffer.

7. The method of claim 1 wherein the cache includes a plurality of L2 caches, wherein one of the plurality of L2 caches is an instruction cache and wherein one of the plurality of L2 caches is a data cache, the method further comprising:
  executing an instruction included in the loaded data in response to the effective address corresponding to data found in the L2 instruction cache.

8. An information handling system comprising:
  a processor that includes a cache, a Segment LookAside Buffer and a Translation LookAside Buffer;
  a routine that identifies a cache set in the cache using buffer attributes, the routine performing steps that include:
    receiving an effective address to load;
    attempting to load the received effective address from a cache, the attempt resulting in a cache miss; and
    in response to the cache miss of the received effective address:
      identifying a segment lookaside buffer entry from a plurality of segment lookaside buffer entries included in a segment lookaside buffer, wherein the effective address is within a range of effective addresses included in the identified segment lookaside buffer entry;
      retrieving a class identifier comprising one or more bits from the identified segment lookaside buffer entry, wherein the class identifier identifies a cache set corresponding to a portion of the cache and corresponding to one of a plurality of processes; and
      reloading data from the cache set of the cache by using the retrieved class identifier that corresponds to the effective address.

9. The information handling system of claim 8 wherein the cache is an L2 cache and the routine performs further steps comprising:
  attempting to identify the effective address in a second cache after the attempt to load the effective address from the L2 cache resulted in a cache miss, wherein the second cache is a cache of recently used translations;
  in response to successfully identifying the effective address in the second cache:
    retrieving a real address and the class identifier from the second cache; and
    using the real address and the class identifier retrieved from the second cache to reload the data from the L2 cache.

10. The information handling system of claim 8 wherein the routine performs further steps comprising:
  prior to identifying the segment lookaside buffer entry that includes the effective address:
    failing to identify the segment lookaside buffer entry, the failure resulting in a subsequent cache miss; and
    in response to the subsequent cache miss:
      generating a software interrupt; and
      reloading the Segment LookAside Buffer.

11. The information handling system of claim 8 wherein, to perform the loading, the routine performs further steps comprising:
  loading a real address corresponding to the effective address and the retrieved class identifier to an L1 cache that includes recently used effective-to-real address translations;
  loading the real address and the class identifier in the cache, wherein the cache is an L2 cache; and
  reloading the data from the cache after the real address and the class identifier have been loaded in the cache.

12. The information handling system of claim 11 wherein the reloading of the data results in a subsequent cache miss, and wherein the routine performs further steps comprising:
  retrieving the data from main memory;
  storing the retrieved data in the cache; and
  re-performing the reloading of the data from the cache.

13. The information handling system of claim 8 wherein the routine performs further steps comprising:
  checking the cache for the received effective address, wherein the cache includes a plurality of L2 caches, wherein one of the plurality of L2 caches is an instruction cache, and wherein one of the plurality of L2 caches is a data cache;
  in response to the received effective address being found in one of the plurality of L2 caches:
    executing an instruction included in the loaded data in response to the effective address corresponding to data found in the L2 instruction cache; and
    loading the data in a register in response to the effective address corresponding to data found in the L2 data cache;
  in response to the received effective address not being found in one of the plurality of L2 caches:
    checking an L1 cache that includes recently used effective-to-real address translations;
    in response to the received effective address being found in the L1 cache:
      loading the real address and the class identifier in a selected one of the plurality of L2 caches; and
      reloading the data from the L2 cache after the real address and the class identifier have been loaded in the selected L2 cache;
    in response to the received effective address not being found in the L1 cache:
      loading the real address and the class identifier in the L1 cache from the Segment LookAside Buffer in response to determining that the received effective address is within a segment range stored in the Segment LookAside Buffer; and
      reloading the Segment LookAside Buffer in response to determining that the received effective address is not within the segment range stored in the Segment LookAside Buffer.

14. The information handling system of claim 8 wherein the cache includes a plurality of L2 caches, wherein one of the plurality of L2 caches is an instruction cache, wherein one of the plurality of L2 caches is a data cache, and the routine performs further steps comprising:
  executing an instruction included in the loaded data in response to the effective address corresponding to data found in the L2 instruction cache.

15. A computer program product stored in a computer readable medium, comprising functional descriptive material that, when executed by an information handling system, causes the information handling system to perform actions that include:

receiving an effective address to load;

attempting to load the received effective address from a cache, the attempt resulting in a cache miss; and in response to the cache miss of the received effective address:

identifying a segment lookaside buffer entry from a plurality of segment lookaside buffer entries included in a segment lookaside buffer, wherein the effective address is within a range of effective addresses included in the identified segment lookaside buffer entry;

retrieving a class identifier comprising one or more bits from the identified segment lookaside buffer entry, wherein the class identifier identifies a cache set corresponding to a portion of the cache and corresponding to one of a plurality of processes; and reloading data from the cache set of the cache by using the retrieved class identifier that corresponds to the effective address.

16. The computer program product of claim 15 wherein the cache is an L2 cache and the functional descriptive material causes the information handling system to perform further actions comprising:

attempting to identify the effective address in a second cache after the attempt to load the effective address from the L2 cache resulted in a cache miss, wherein the second cache is a cache of recently used translations;

in response to successfully identifying the effective address in the second cache:

retrieving a real address and the class identifier from the second cache; and using the real address and the class identifier retrieved from the second cache to reload the data from the L2 cache.

17. The computer program product of claim 15 wherein the functional descriptive material causes the information handling system to perform further actions comprising:

prior to identifying the segment lookaside buffer entry that includes the effective address:

failing to identify the segment lookaside buffer entry, the failure resulting in a subsequent cache miss; and in response to the subsequent cache miss:

generating a software interrupt; and reloading the Segment LookAside Buffer.

18. The computer program product of claim 15 wherein the functional descriptive material used to perform the loading further include functional descriptive material that causes the information handling system to perform further actions comprising:

loading a real address corresponding to the effective address and the retrieved class identifier to an L1 cache that includes recently used effective-to-real address translations;

loading the real address and the class identifier in the cache, wherein the cache is an L2 cache; and reloading the data from the cache after the real address and the class identifier have been loaded in the cache.

19. The computer program product of claim 18 wherein the reloading of the data results in a subsequent cache miss, and wherein the functional descriptive material causes the information handling system to perform further actions comprising:

retrieving the data from main memory;

storing the retrieved data in the cache; and re-performing the reloading of the data from the cache.

20. The computer program product of claim 15 wherein the functional descriptive material causes the information handling system to perform further actions comprising:

checking the cache for the received effective address, wherein the cache includes a plurality of L2 caches, wherein one of the plurality of L2 caches is an instruction cache, and wherein one of the plurality of L2 caches is a data cache;

in response to the received effective address being found in one of the plurality of L2 caches:

executing an instruction included in the loaded data in response to the effective address corresponding to data found in the L2 instruction cache; and loading the data in a register in response to the effective address corresponding to data found in the L2 data cache;

in response to the received effective address not being found in one of the plurality of L2 caches:

checking an L1 cache that includes recently used effective-to-real address translations;

in response to the received effective address being found in the L1 cache:

loading the real address and the class identifier in a selected one of the plurality of L2 caches; and reloading the data from the L2 cache after the real address and the class identifier have been loaded in the selected L2 cache;

in response to the received effective address not being found in the L1 cache:

loading the real address and the class identifier in the L1 cache from the Segment LookAside Buffer in response to determining that the received effective address is within a segment range stored in the Segment LookAside Buffer; and reloading the Segment LookAside Buffer in response to determining that the received effective address is not within the segment range stored in the Segment LookAside Buffer.

* * * * *